United States Patent
Sandner et al.

(10) Patent No.: US 7,990,074 B2
(45) Date of Patent: Aug. 2, 2011

(54) ADAPTIVE ALGORITHM FOR CAMERA FLASH LED POWER CONTROL VS. BATTERY IMPEDANCE, STATE OF DISCHARGE (SOD), AGING, TEMPERATURE EFFECTS

(75) Inventors: Harald Sandner, Marzling (DE); Christophe Vaucourt, Munich (DE); Hans Schmeller, Woerth (DE); Martin Rommel, Freising (DE); Helmut Kiml, Tiefenbach (DE)

(73) Assignee: Texas Instruments Deutschland GmbH, Freising (DE)

( * ) Notice: Subject to any disclaimer, the term of this patent is extended or adjusted under 35 U.S.C. 154(b) by 414 days.

(21) Appl. No.: 12/260,497

(22) Filed: Oct. 29, 2008

(65) Prior Publication Data

US 2009/0121644 A1    May 14, 2009

(30) Foreign Application Priority Data

Nov. 14, 2007  (DE) .......................... 10 2007 054 253

(51) Int. Cl.
*H05B 37/00*  (2006.01)
*H05B 39/00*  (2006.01)
*H05B 41/14*  (2006.01)

(52) U.S. Cl. ..................... 315/291; 315/241 P; 315/297

(58) Field of Classification Search .................. 315/291, 315/241 P, 297, 294
See application file for complete search history.

(56) References Cited

U.S. PATENT DOCUMENTS

| | | | |
|---|---|---|---|
| 6,791,283 B2 * | 9/2004 | Bowman et al. .............. 315/291 |
| 7,265,681 B2 * | 9/2007 | Chen ......................... 340/815.45 |
| 7,782,018 B2 | 8/2010 | Voigt | |
| 7,880,404 B2 * | 2/2011 | Deng et al. .................... 315/291 |
| 2003/0076051 A1 | 4/2003 | Bowman et al. | |

FOREIGN PATENT DOCUMENTS

| | | |
|---|---|---|
| DE | 10333418 A1 | 2/2005 |
| WO | 2006081613 A1 | 8/2006 |

* cited by examiner

*Primary Examiner* — Daniel D Chang
(74) *Attorney, Agent, or Firm* — John J. Patti; Wade J. Brady, III; Frederick J. Telecky, Jr.

(57) ABSTRACT

A method for driving a light-emitting semiconductor is provided. A supply voltage is converted into a secondary output voltage for supplying the light-emitting semiconductor with an output voltage. A level for the supply voltage at the beginning of a high current phase of the light-emitting semiconductor is sensed. A threshold voltage level for the supply voltage level is determined based on the sensed level. The high current phase with the light-emitting semiconductor is stated. The sensed level is continuously compared with the threshold voltage level, and an output current through the light-emitting semiconductor is controlled such that the sensed level does not drop below the threshold voltage level.

15 Claims, 3 Drawing Sheets

ADAPTIVE ALGORITHM FOR CAMERA FLASH LED POWER CONTROL VS. BATTERY IMPEDANCE, STATE OF DISCHARGE (SOD), AGING, TEMPERATURE EFFECTS

CROSS-REFERENCE TO RELATED APPLICATIONS

This claims priority to German Patent Appl. Ser. No. 102007054253.6-34 filed on Nov. 14, 2007. This application also relates to co-pending U.S. patent application Ser. No. 12/260,156, entitled "LED DRIVER WITH ADAPTIVE ALGORITHM FOR STORAGE CAPACITOR PRE-CHARGE" filed on Oct. 29, 2008, which claims priority to German Patent Appl. Ser. No. 102007051793.0 filed on Oct. 30, 2007. Each application is hereby incorporated by reference for all purposes.

TECHNICAL FIELD

The invention relates generally to a method for driving light-emitting semiconductors device and, more particularly, to an adaptive algorithm for flash light-emitting diode (LED) power control.

BACKGROUND

Portable electronic devices, such as mobile phones, personal digital assistants (PDAs) and digital cameras integrate more and more functionality in order to provide a broad variety of features. In particular, there are highly integrated cameras having integrated flash lights, and there are mobile phones that include digital, high resolution cameras with integrated flash lights. The light source used for the flash is capable of appropriate illumination within a target range greater than 150 Lux within one meter. Meanwhile, semiconductor technology has advanced to an extent that LEDs can be used as light sources for camera flash operation. However, the LEDs used for this purpose are typically driven with a peak current. The battery-driven hand-held mobile devices have to provide these high output currents for several hundred milliseconds. Dependent on the charging state of the battery, the battery's output impedance and other battery specific parameters, the high peak current loading can result in a battery voltage drop that can cause system failures.

In FIGS. 1 and 2 are graphs depicting battery voltage as a function of time for four different ($V_1$ through $V_4$) operating conditions of a portable device that generates a flash in a light-emitting semiconductor: a new battery at a temperature of 25° C.; a new battery at a temperature of −10° C.; a battery after 1000 charge/discharge cycles at −10° C.; and a battery after 1000 charge/discharge cycles at 25° C. FIG. 2 is an expanded view of the graph in FIG. 1 from 0-1.8 ms. The voltage drop can be divided into two phases, a first phase (within about 100 μs from the beginning of the high current phase dependant on the age and the temperature of the battery) and a second phase (from the end of the first phase until the end of the high current phase) where the voltage drop has exponential behavior. As the light-emitting semiconductor generates a flash, at t=0 ms, the battery voltage drops suddenly. In the newer batteries that are operating at warmer temperatures, the voltage does not drop any further than the initial voltage drop; however, the voltage level of the older batteries operating under colder conditions continues to drop throughout the duration of the flash, which can last from approximately 120 ms to 500 ms. The battery operating at −10° C. after 1000 cycles of use has the largest voltage drop, of around 0.6 V, whereas the new battery operating at 25° C. has the smallest voltage drop, of around 0.2 V. When the light-emitting semiconductor stops generating the flash, the voltage level of the battery increases again back to its original level before the start of the flash. In the newer batteries operating at higher temperatures, it can be seen that this happens almost instantaneously, whereas in the older batteries operating at lower temperatures (most particularly for the battery operating at −10° C. after 1000 cycles of use) it can take around 400 ms before the battery voltage is back to its original level.

Some examples of conventional devices are U.S. Patent Pre-Grant Pub. No. 2003/0076051, German Patent No. 10333418, and PCT Appl. No. WO2006/081613.

SUMMARY

A preferred embodiment of the present invention, accordingly, provides a method for driving a light-emitting semiconductor. A supply voltage is preferably converted from a primary power supply into a secondary output voltage for supplying the light-emitting semiconductor with the output voltage. The initial supply voltage level can be sensed at the beginning (i.e., in a range shortly before or after the beginning) of a high current phase of the light-emitting semiconductor. The high current phase can be the period of time during which a substantially higher current can be requested from the light-emitting semiconductor at the secondary output than during normal operation. After having sensed the supply voltage level, a threshold voltage level for the supply voltage level can be determined based on the sensed supply voltage level. Advantageously, the threshold voltage level can be set within about a few tenths of a microsecond after the circuit is triggered to provide a flash strobe. The high current phase can then be started and an increased output current can be supplied to the light-emitting semiconductor. Thereby, the sensed supply voltage level can be continuously compared with the threshold voltage level, and the output current through the light-emitting semiconductor can be controlled in response to the comparison such that the sensed supply voltage level does not drop below the threshold voltage level.

According to this aspect of the invention, the current state of the primary power supply can be evaluated and a threshold voltage for the supply voltage can be determined based on its current state. Also, the current through the light-emitting semiconductor can be controlled based on the result of this comparison so that the supply voltage level does not fall below the determined threshold voltage from which the primary power supply could hardly recover. The threshold voltage can be determined in regard of the allowable droop, where voltage droop means a drop to the allowable supply voltage level at the end of the high current phase. The actual supply voltage level can be continuously compared with the threshold voltage level, whilst the current through the light-emitting semiconductor can be increasing in the high current phase. The current of the light-emitting semiconductor can be adjusted to a level based on the state of the primary voltage supply and the power management criteria of the system, without the need for an accurate determination of the characteristic of the primary voltage supply. Since the supply voltage is preferably not allowed to drop below the predetermined threshold level, system failures can be prevented.

Preferably, the method further comprises increasing (e.g., continuously or step-wise) the output current through the light-emitting semiconductor during the high current phase and maintaining a magnitude of the output current when the sensed supply voltage level is generally equal to the threshold voltage level. Current flowing through the light-emitting semiconductor is controlled so that it can be increased during the high current phase. When the current through the light-emitting semiconductor has been increased, the magnitude of the current can be maintained during the time when it is sensed that the sensed supply voltage level is generally equal to the threshold voltage level. This way the magnitude of the output current can be "frozen" at the specific point of time, when the supply voltage level has reached its allowable value. The threshold voltage level for the voltage level can also be chosen such that the power supply can be capable of supplying this value of an output current over the entire remaining high current phase. Therefore, a further drop of the supply voltage level is generally not to be expected.

The threshold voltage level can be determined on the basis of the initially sensed supply voltage level and an allowable droop of the supply voltage level at the end of the high current phase. The supply voltage level can be allowed a droop at the end of the high current phase so that the supply voltage level does not collapse too much. A supply voltage (e.g., the battery voltage) droop monitoring feature can be integrated. Based on this allowable droop in the supply voltage level, and the supply voltage level that can be sensed initially, the threshold voltage can be determined. The method then takes into account the supply voltage droop that occurs at the end of the high current phase. For example, the threshold voltage level can be calculated based on the current supply voltage level (e.g., a battery) minus a user settable value (e.g., a few mV to about 500 mV). Therefore, this aspect can be considered as a droop measurement relative to the input voltage, rather than an absolute value.

The light-emitting semiconductor produces a flash during the high current phase. The flash can have a duration of several hundred milliseconds and the threshold voltage level can be determined within a few microseconds (e.g., about 10 μs or about 500 μs) before or after the beginning of the flash. During the high current phase, a flash strobe can be generated in the light-emitting semiconductor. The flash strobe itself, i.e., the loading of the supply voltage, can last approximately 30 ms to about 500 ms in particular applications. The initial drop in the supply voltage level at the beginning of the high current phase can be calibrated to reflect the droop of the supply voltage. Adjustment or compensation of the threshold voltage level can then be performed by a software adjustment ahead of the high current phase.

According to another aspect, the power supply for providing the supply voltage can be a battery, an accumulator or another rechargeable energy storage device. Some of those devices show a different behavior (e.g., a specific linear or non-linear voltage drop) during a first phase of a high current period and during a second phase after the first phase (e.g., a non-linear voltage drop but different from the first phase). For these power supplies, the present invention provides that the threshold voltage level for the comparison can be chosen such that the increase of the output current can be stopped within the first phase. This aspect provides that the power supply can maintain the corresponding output current level for the remainder of the high current phase and no further voltage drop must be expected. Further, the power supply will recover quicker from the high current phase than with threshold level that is so low that the primary power supply is already in the second non-linear phase of dropping.

The present invention also provides an electronic device including a driver for driving a light-emitting semiconductor. The electronic device comprises a voltage converter for generating an output voltage from a primary power source having a supply voltage level. A control stage can be adapted to initiate and to control a high current phase of the light-emitting semiconductor. Further, the control stage can be adapted to determine a threshold voltage level for the primary voltage at the beginning of the high current phase. The control stage can also be adapted to compare the supply voltage level with the threshold voltage level during the high current phase, and to control an output current through the light-emitting semiconductor during the high current phase such that the supply voltage level does not fall below the threshold voltage level. An electronic device can be provided with a driver for driving a light-emitting semiconductor, for example, an LED. An output voltage can be generated by a voltage converter for driving the light-emitting semiconductor. The voltage converter converts a supply voltage from a primary power source, for example a battery used as a power supply to the device, into the output voltage. A high current phase of the light-emitting semiconductor can be initiated and controlled by a control stage. At the start of the high current phase, the control stage also determines a threshold voltage level for the supply voltage. The threshold level can be determined based on the power management criteria of the device. During the high current phase, the control stage compares the voltage level of the supply voltage with the determined threshold voltage level. Also during the high current phase, the control stage controls an output current that flows through the light-emitting semiconductor so that the threshold voltage level is not exceeded by the supply voltage. On-chip dynamic supervision of the supply voltage level can then be achieved with adaptive control of the current through the light-emitting semiconductor. Therefore, the power of the light-emitting semiconductor can be adjusted based on the state of the power supply (such as a battery) and the power management criteria of the electronic device.

Preferably, the control stage can be further adapted to continuously increase the output current during the high current phase and to maintain the output current at a generally constant level when the sensed supply voltage level is generally equal to the threshold voltage level. In the high current phase, the output current through the light-emitting semiconductor can be ramped up by the control stage. The supply voltage level drops when the output current can be increased. When it is sensed by the control stage that the supply voltage level has dropped to a level that is generally equal to the threshold voltage level, the output current through the light-emitting semiconductor can be maintained at a generally constant level by the control stage. Therefore, the light output of the light-emitting semiconductor can be adjusted for a given primary voltage supply (such as a battery) state. For example, if a battery used to power the electronic device is cold, or has aged (or been used for a large number of charge cycles), the drop in the supply voltage level will be greater during the high current phase and the output current can be adjusted accordingly.

In accordance with another preferred embodiment of the present invention, a method for driving a light-emitting semiconductor is provided. The method comprises converting a supply voltage into a secondary output voltage for supplying the light-emitting semiconductor with an output voltage; sensing a level for the supply voltage at the beginning of a high current phase of the light-emitting semiconductor; determining a threshold voltage level for the supply voltage level based on the sensed level; starting the high current phase with the light-emitting semiconductor; continuously comparing the sensed level with the threshold voltage level; and controlling an output current through the light-emitting semiconductor such that the sensed level does not drop below the threshold voltage level.

In accordance with another preferred embodiment of the present invention, the method further comprises the steps of increasing the output current through the light-emitting semiconductor during the high current phase; and maintaining a magnitude of the output current once the sensed level is generally equal to the threshold voltage level.

In accordance with another preferred embodiment of the present invention, the step of determining further comprises the step of determining the threshold voltage level based on the sensed level and an allowable droop of the supply voltage at the end of the high current phase.

In accordance with another preferred embodiment of the present invention, the method further comprises the steps of generating a flash by the light-emitting semiconductor during the high current phase; and determining the threshold voltage level within one microsecond from the beginning of the flash.

In accordance with another preferred embodiment of the present invention, an apparatus is provided. The apparatus comprises a plurality of light emitters; a driver that receives a supply voltage and outputs a secondary voltage to a plurality of outputs paths, wherein each output path includes at least one light emitter; a current regulator coupled to each output path, wherein the current regulator can be adapted to determine a current through each output path; and a controller that can be coupled to the driver, the current regulator, and the output paths, wherein the controller includes: a comparator that compares the supply voltage to a threshold voltage during a high current phase; and control logic that determines the threshold voltage level at the beginning of the high current phase and that controls an output current through the light-emitter during the high current phase such that the supply voltage does not fall below the threshold voltage level.

In accordance with another preferred embodiment of the present invention, the controller can be adapted to continuously increase the output current during the high current phase and to maintain the output current at a generally constant level once the supply voltage is generally equal to the threshold voltage level.

In accordance with another preferred embodiment of the present invention, the plurality of light emitters are LEDs.

In accordance with another preferred embodiment of the present invention, a capacitor can be coupled to each output path.

In accordance with another preferred embodiment of the present invention, the controller further comprises a sensor that senses a current level for each output path and that compares each sensed current level to a reference level; and adjusters that provide control signals to the current regulator.

In accordance with another preferred embodiment of the present invention, the adjusters further comprise a plurality of digital to analog converters (DACs).

In accordance with another preferred embodiment of the present invention, the sensor further comprises a multiplexer that receives a sense signal from each output path; and a comparator that compares the output of the multiplexer to the reference level.

In accordance with another preferred embodiment of the present invention, an apparatus for driving a light-emitting semiconductor. The apparatus comprises means for converting a supply voltage into a secondary output voltage for supplying the light-emitting semiconductor with an output voltage; means for sensing a level for the supply voltage at the beginning of a high current phase of the light-emitting semiconductor; means for determining a threshold voltage level for the supply voltage level based on the sensed level; means for starting the high current phase with the light-emitting semiconductor; means for continuously comparing the sensed level with the threshold voltage level; and means for controlling an output current through the light-emitting semiconductor such that the sensed level does not drop below the threshold voltage level.

In accordance with another preferred embodiment of the present invention, the apparatus further comprises the steps of means for increasing the output current through the light-emitting semiconductor during the high current phase; and means for maintaining a magnitude of the output current once the sensed level is generally equal to the threshold voltage level.

In accordance with another preferred embodiment of the present invention, the means for determining further comprises means for determining the threshold voltage level based on the sensed level and an allowable droop of the supply voltage at the end of the high current phase.

In accordance with another preferred embodiment of the present invention, the apparatus further comprises means for generating a flash by the light-emitting semiconductor during the high current phase; and means for determining the threshold voltage level within one microsecond from the beginning of the flash.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
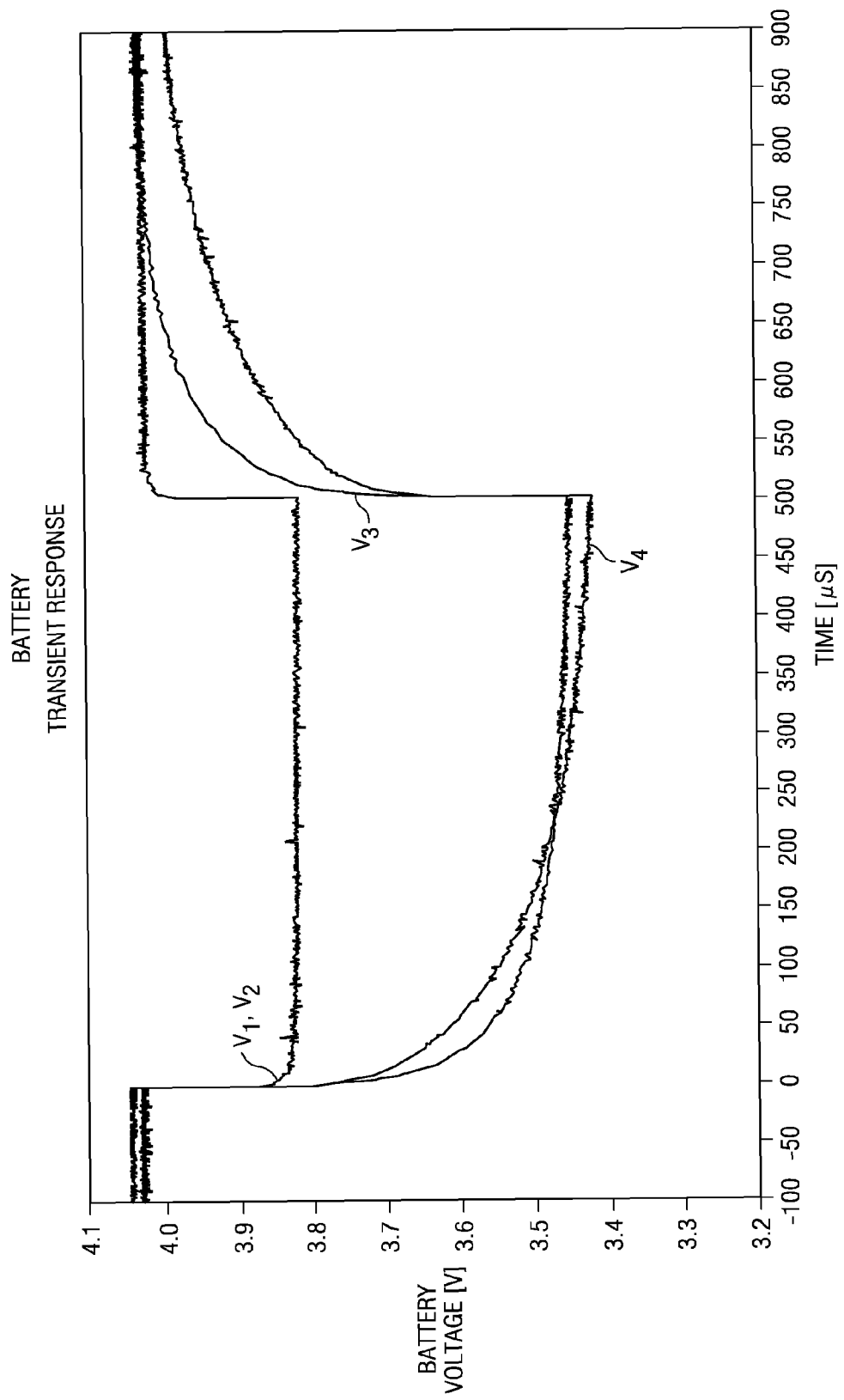
FIG. 1 is a graph of the supply voltage as a function of time in an electronic device during generation of a flash strobe in a light-emitting semiconductor at different temperatures and battery ages.
Figure 2:
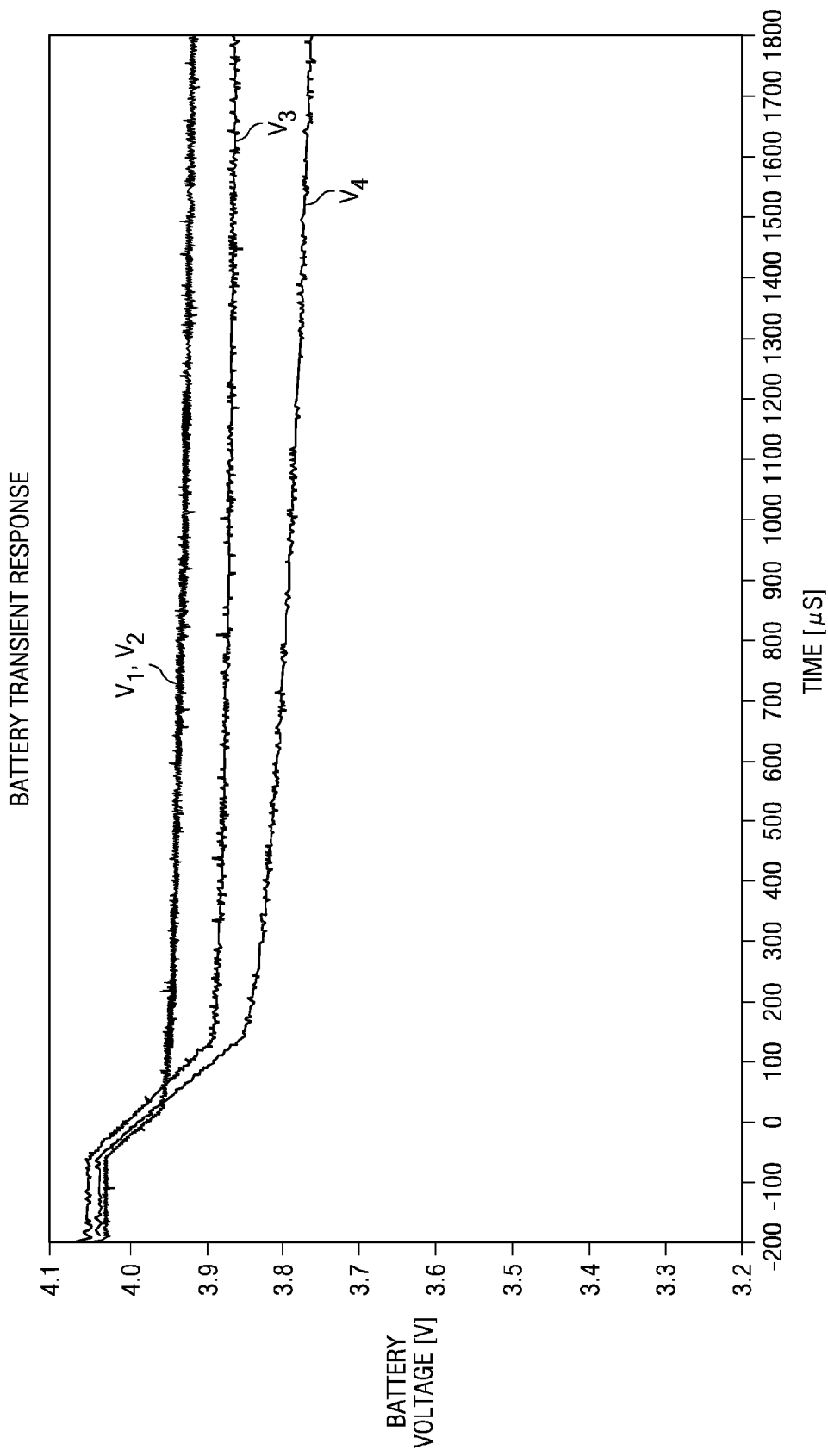
FIG. 2 is an expanded version of the graph shown in FIG. 1.

Refer now to the drawings wherein depicted elements are, for the sake of clarity, not necessarily shown to scale and wherein like or similar elements are designated by the same reference numeral through the several views.

In a desired operation in accordance with a preferred embodiment of the present invention, a sequence of flash light generation in an LED is as follows. During a first period, the LED (or multiple LEDs) are controlled to produce a generally constant light during a predetermined period of time. During this period, only a small amount of current can be drawn from the battery, such that no relevant voltage drop at the supply battery occurs. A flash synchronization signal indicates by a transition from low to high that a flash can be produced by the LED or the LEDs. At this point of time, the actual battery voltage level can be determined, and an allowable battery drop can be derived from the measured battery voltage level. In order to produce the flash light with the LEDs, the LED current can be increased with a predetermined slew rate and a fixed step size of 50 mA. The slew rate could be, for example, 8.5 mA/gs. While the LED current is linearly increased, the voltage level at the battery drops. When the voltage level at the battery reaches an allowable voltage level, the controller 130 of the circuit 100 can be triggered to stop ramping the LED current. The actual flash current can then be frozen at 650 mA, which can be substantially below the target flash current of 950 mA. However, maintaining the flash current ILED at 650 mA avoids a further reduction of the battery voltage level.

Figure 3:
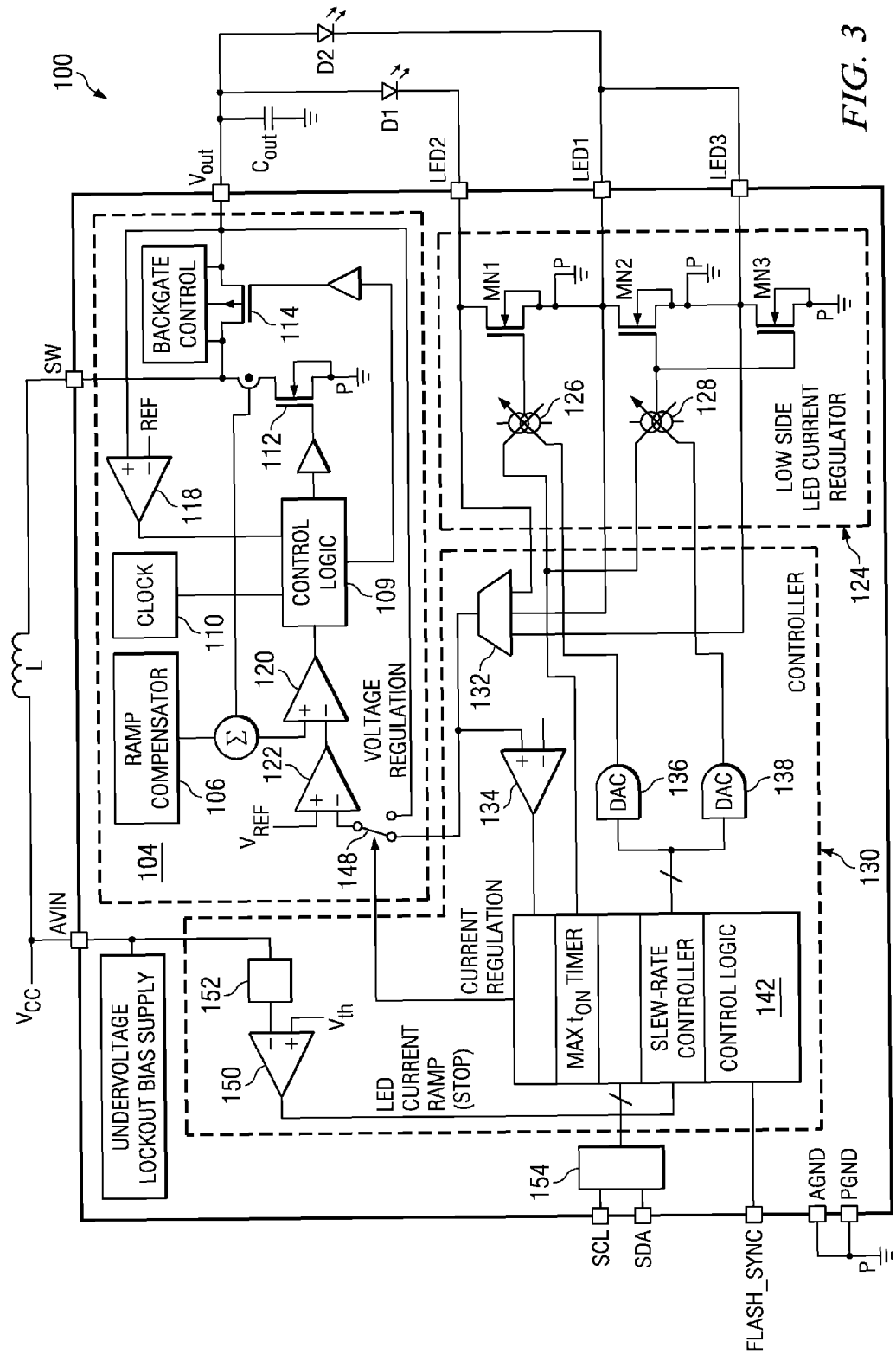
FIG. 3 is a simplified circuit diagram in accordance with a preferred embodiment of the present invention.

FIG. 3 shows a simplified circuit diagram in accordance with a preferred embodiment of the present invention. A supply voltage rail $V_{CC}$, can be connected to a power supply or battery, which supplies power to the circuit 100. An inductor L can be connected to the supply voltage rail $V_{CC}$ and acts, in conjunction with driver 104 and capacitor $C_{out}$, as a DC-DC voltage converter (DC-DC boost or buck converter) for converting the supply voltage into a secondary output voltage at an output voltage rail $V_{out}$. Driver 104 includes an oscillator or clock 110, control logic 109, two power MOSFETs 112 and 114, a comparator 118, and a ramp compensator 106 as well as a second comparator 120 and an error amplifier 122. The driver 104 can be coupled with a pin SW to the inductor L, which can be coupled to the primary power supply ($V_{CC}$). The output voltage rail $V_{out}$ can be connected to a capacitor $C_{out}$, which can be coupled to ground.

Additionally, coupled to the output voltage rail $V_{out}$ of the DC-DC converter is a pair of LEDs D1 and D2. It may also be possible to replace LEDs D1 and D2 any light-emitting semiconductors. LEDs D1 and D2 are connected to controller 130 and a low-side current regulator 124, which regulates current through the LEDs D1 and D2. Within regulator 124, there are three NMOS transistors MN1, MN2 and MN3 operating as current regulators or current sinks with source terminals of the transistors MN1, MN2, and MN3 being connected to the cathodes of the LEDs D1 and D2. Current regulator 124 can also be comprised of controllable current sources 126 and 128 coupled to the gates of transistors MN1, MN2, and MN3, where each current source 126 and 128 receives an on/off signal and a current control signal from controller 130. This allows the current source 126 and 128 to control transistors MN1, MN2 and MN3. Moreover, in a high side driver configuration the current regulators can be implemented with PMOS transistors, so as to operate as current sources. The present invention can be equally applied to low-side driver configurations and high-side driver configurations.

Additionally, each of LED1, LED2 and LED3 can be coupled to controller 130. The controller 130 has a multiplexer 132, control logic 142, digital to analog converters (DACs) 136 and 138, and a comparator 134. Multiplexer 132 receives outputs from LED1, LED2 and LED3, and comparator 134 receives the sensed voltage of the LEDs D1 and D2 via the multiplexer 132 at its positive input and a reference voltage at its negative input. The output of the comparator 134 can be connected to the control logic 142. The control logic 142 has an output for regulating the supply voltage $V_{out}$, and can be connected thereto by a switch 148 and further control logic. The switch 148 can be operable to switch between negative input of amplifier 122 (for current mode regulation) and the supply voltage rail $V_{out}$ (for voltage regulation mode).

The controller 130 also includes a "ramp stop" circuit. The supply voltage rail $V_{CC}$ can be coupled to the negative input of a comparator 150 (through a deglitch circuit 152), with the positive input of the comparator 150 being connected to a reference voltage $V_{th}$, which can be the low threshold voltage level for the supply voltage. The low threshold voltage level $V_{th}$ can be calculated based on the currently sensed supply voltage level minus a user settable value (which is typically between a few mV to 500 mV). Therefore, this can be considered to be a droop measurement relative to the input voltage, rather than an absolute value. The output of the comparator 150 can be coupled to an input of the control logic 142.

The circuit 100 also includes an I²C interface 154 having pins SCL and SDA for receiving and transmitting commands or data. Preferably, the configuration of circuit 100 can be performed through the I²C interface 154. A FLASH_SYNC pin can also be provided for receiving a flash synchronization signal. The signal can be used to synchronize the operation of the circuit 100.

In operation, the supply voltage from the primary power supply rail $V_{CC}$ can be converted to output voltage at the output voltage rail $V_{out}$, which can be supplied to the LEDs D1 and D2. The current through the LEDs D1 and D2 can be gradually increased (stepwise), by using the control logic 142. The transistors MN1, MN2 and MN3 are controlled so that they allow more or less current to flow through the LEDs D1 and D2. At the start of ramping up the current through the LEDs D1 and D2, the initial supply voltage level at the supply voltage rail $V_{CC}$ can be sensed and held at the comparator 150. Thereby, a flash can be generated by the LEDs D1 and D2, which lasts several hundred milliseconds.

Generation of the flash causes the voltage level at the supply voltage rail $V_{CC}$ to drop suddenly. This voltage drop will be greater if the power supply connected to the supply voltage rail $V_{CC}$ is old, or if it is operating under cold conditions (e.g. below 0° C.). Within a few microseconds from the beginning of the duration of the flash, a lower threshold voltage level $V^{th}$ for the sensed supply voltage level can be determined based on the sensed initial supply voltage (such as within less than a few tenths of a microsecond after the circuit 100 can be triggered to generate a flash strobe) at the supply voltage rail $V_{CC}$ and the allowable droop of the supply voltage level (for example, the absolute minimum voltage level at the voltage rail $V_{CC}$ that does not cause a battery collapse) when the current through the LEDs D1 and D2 has reached its upper level at the end of the ramping up phase. For example, the threshold voltage level $V_{th}$ can be set to a value that is the sensed supply voltage level right after the circuit 100 can be triggered to provide the flash minus a generally constant value, for example, between a few mV and 500 mV. The voltage level at the supply voltage rail $V_{CC}$ can be continuously compared with the threshold voltage level $V_{th}$ by the comparator 150 while the current through the LEDs D1 and D2 can be ramped up.

The result of the comparison can be fed to the control logic 142. When it is determined by the comparator 150 that the sensed supply voltage level at the supply voltage rail $V_{CC}$ is generally equal to the threshold voltage level $V_{th}$, the control logic 142 controls the gate voltages of the transistors MN1, MN2 and MN3, and therefore the output current through the LEDs D1 and D2, so that the sensed supply voltage level at the primary voltage supply rail $V_{CC}$ does not drop below the threshold voltage level $V_{th}$. Accordingly, if the voltage level $V_{CC}$ at pin AVIN drops below $V_{th}$, the comparator 150 output is high and if the voltage level at AVIN is greater than the threshold voltage level $V_{th}$, the output of comparator 150 is low, thereby indicating with a transition from low to high that the output voltage can be frozen (i.e., maintained at the current level). The negative input of comparator 150, which can be coupled to pin AVIN can preferably be coupled to a deglitching stage 152 for suppressing or removing any glitches from the input signal received at the input pin AVIN. The magnitude of the current through the LEDs D1 and D2 can be kept the same by the control logic 142 once the supply voltage is generally equal to the threshold voltage level $V_{th}$.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method for driving a light-emitting semiconductor, the method comprising:
   converting a supply voltage into a secondary output voltage for supplying the light-emitting semiconductor with an output voltage and an output current during a high current phase;
   sensing a level for the supply voltage at the beginning of the high current phase of the light-emitting semiconductor;
   determining a threshold voltage level for the supply voltage level based on the sensed level;
   starting the high current phase with the light-emitting semiconductor;
   continuously comparing the sensed level with the threshold voltage level; and
   controlling the output current through the light-emitting semiconductor such that the sensed level does not drop below the threshold voltage level.

2. The method of claim 1, wherein the method further comprises the steps of:
   increasing the output current through the light-emitting semiconductor during the high current phase; and
   maintaining a magnitude of the output current once the sensed level is generally equal to the threshold voltage level.

3. The method of claim 1, wherein the step of determining further comprises the step of determining the threshold voltage level based on the sensed level and an allowable droop of the supply voltage at the end of the high current phase.

4. The method of claim 1, wherein the method further comprises the steps of:
   generating a flash by the light-emitting semiconductor during the high current phase; and
   determining the threshold voltage level within one microsecond from the beginning of the flash.

5. An apparatus comprising:
   a plurality of light emitters;
   a driver that receives a supply voltage and outputs a secondary voltage and an output current to each of a plurality of outputs paths during a high current phase, wherein each output path includes at least one of the light emitters;
   a current regulator coupled to each output path, wherein the current regulator is adapted to determine the output current through each output path; and
   a controller that is coupled to the driver, the current regulator, and the output paths, wherein the controller includes:
      a comparator that compares the supply voltage to a threshold voltage during the high current phase; and
      control logic that determines the threshold voltage level at the beginning of the high current phase and that controls the output current through each of the light-emitters during the high current phase such that the supply voltage does not fall below the threshold voltage level.

6. The apparatus of claim 5, wherein the controller is adapted to
   continuously increase the output current during the high current phase and to maintain the output current at a generally constant level once the supply voltage is generally equal to the threshold voltage level.

7. The apparatus of claim 6, wherein the plurality of light emitters are LEDs.

8. The apparatus of claim 7, wherein the sensor further comprises:
   a multiplexer that receives a sense signal from each output path; and
   a comparator that compares the output of the multiplexer to the reference level.

9. The apparatus of claim 6, wherein a capacitor is coupled to each output path.

10. The apparatus of claim 6, wherein the controller further comprises:
    a sensor that senses a current level for each output path and that compares each sensed current level to a reference level; and
    adjusters that provide control signals to the current regulator.

11. The apparatus of claim 10, wherein the adjusters further comprise a plurality of digital to analog converters (DACs).

12. An apparatus for driving a light-emitting semiconductor, the apparatus comprising:
    means for converting a supply voltage into a secondary output voltage for supplying the light-emitting semiconductor with an output voltage and an output current during a high current phase;
    means for sensing a level for the supply voltage at the beginning of the high current phase of the light-emitting semiconductor;
    means for determining a threshold voltage level for the supply voltage level based on the sensed level;
    means for starting the high current phase with the light-emitting semiconductor;
    means for continuously comparing the sensed level with the threshold voltage level; and
    means for controlling the output current through the light-emitting semiconductor such that the sensed level does not drop below the threshold voltage level.

13. The apparatus of claim 12, wherein the apparatus further comprises:
    means for increasing the output current through the light-emitting semiconductor during the high current phase; and
    means for maintaining a magnitude of the output current once the sensed level is generally equal to the threshold voltage level.

14. The apparatus of claim 12, wherein the means for determining further comprises means for determining the threshold voltage level based on the sensed level and an allowable droop of the supply voltage at the end of the high current phase.

15. The apparatus of claim 12, wherein the apparatus further comprises:
    means for generating a flash by the light-emitting semiconductor during the high current phase; and
    means for determining the threshold voltage level within one microsecond from the beginning of the flash.

* * * * *